Nov. 1, 1932. K. V. HIEBER 1,885,721
SCALE BEARING
Filed Dec. 30, 1929
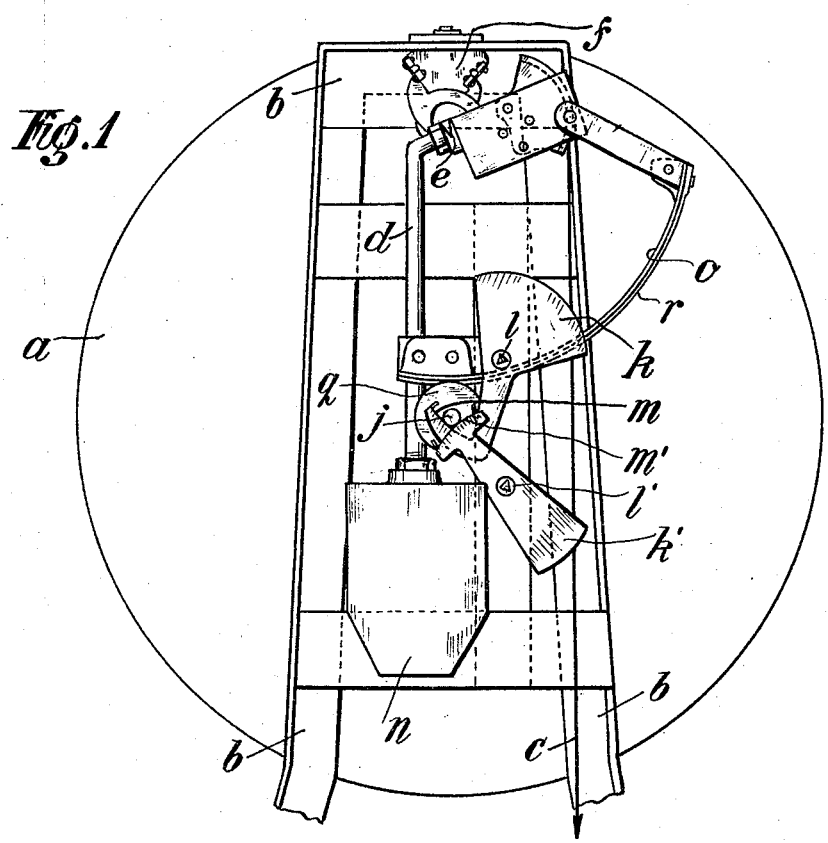
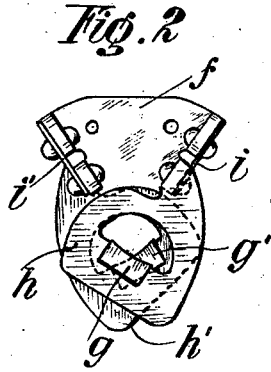
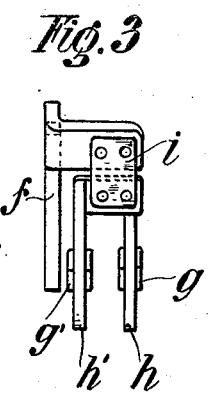
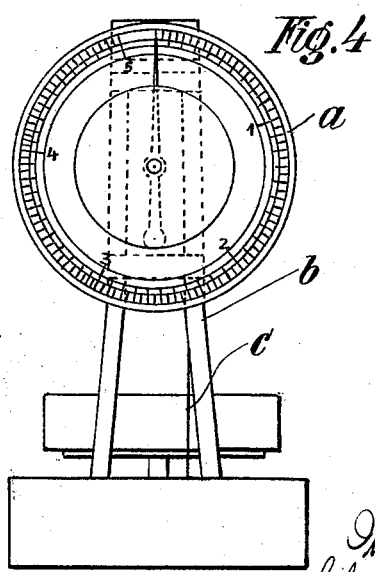

Patented Nov. 1, 1932

1,885,721

UNITED STATES PATENT OFFICE

KARL VIKTOR HIEBER, OF GRAZ, AUSTRIA

SCALE BEARING

Application filed December 30, 1929, Serial No. 417,526, and in Austria April 15, 1929.

This invention relates to the mounting of shafts and spindles, and has particular reference to the pointer-spindle of weighing machines and other measuring appliances.

It is known to form the bearings of the movable parts of weighing scales and other measuring instruments, for instance knife-edges, shafts and so forth, by means of arms which are rockingly suspended and cross each other, and to subject these arms to the action of elastic pulling members, which have the tendency to maintain the arms in the mean position.

The rocking suspension of the carrying arms, which also calls for knife-edge bearings and seats, as well as the provision of means for subjecting the carrying arms to the action of an elastic pull can be dispensed with if, according to the present invention, the carrying arms are constructed as laterally yielding members or are secured to the frame by means of an elastic member, for instance a plate-spring. In this way the bearing is considerably simplified without suffering in accuracy.

It is also known to use rocking arms for mounting the shaft of a pointer which are provided with crossed concave bearing-faces on which rolls the pointer-shaft during its rotation. These arms, loaded by balancing weights, rock in bearings, which are arranged in the same height, and therefore the arrangement of the bearing frames is limited to a few places only and the same have to be arranged comparatively close together with the result of an unfavorably large crossing angle of the bearing-faces. According to the present invention one of the crossing arms is arranged above and the other arm below the shaft to be carried and the bearing-face of the one arm is convex while the bearing-face of the other arm is concave so that the bearing is constructed partly as a standing bearing and partly as a suspended bearing and can be readily secured to the bearing frames at the same vertical post of the frame of the scales and is very sensitive and exact.

One mode of carrying out the present invention is illustrated by way of example on the accompanying sheet of drawing in connection with pendulum weighing scales.

Fig. 1 is a view of the upper part of a weighing scale provided with knife-edge bearings, a shaft-bearing and members for transmitting the movements, unessential parts being omitted.

Figs. 2 and 3 show a knife-edge bearing in front view and side view respectively.

Fig. 4 is a view of the weighing scale.

The mechanisms of the scale as well as the dial $a$ are arranged on the frame $b$ of the scale. Fig. 1 shows the transmission member $c$, which extends from the bridge and operates the pendulum weight construction $d$, the latter being mounted for rocking movement by means of its knife-edge $e$ in the bearing (Figs. 2 and 3) constructed according to the present invention.

This bearing consists of the bearing-frame $f$ and the crossed carrying arms $h, h'$, which support the bearing faces $g, g'$ and, according to the present invention, are secured either directly to the bearing-frame and constructed so that they can be bent upwardly elastically in the lateral direction, or as shown in the drawing the said arms are connected with the bearing frame by means of bendable elastic intermediate members, for instance by plate-springs $i, i'$ fixed at both ends.

The bearing for use in connection with rotating members, for instance the shaft $j$ of the pointer playing on the dial $a$, consists of crossed arms $k, k'$ (Fig. 1) with knife-edges $l, l'$, which are mounted in bearing-seats, arranged at different heights. These seats are shaped as shown in Figs. 2 and 3. The arm $k$ is provided with a concave bearing-face $m$, while the arm $k'$ is furnished with a convex bearing-face $m'$. The arms $k$ and $k'$ are balanced and carry the pointer-shaft $j$ at the crossing place of the convex and concave bearing-faces, so that one face operates as a standing bearing-member and the other face as a suspended bearing-member, whereby a favorable crossing angle of the bearing-face is obtained in view of the arrangement of the two arms at different heights.

The oscillations of the pendulum weight construction $d$, balanced by a balancing weight $n$, are transmitted to the drum $q$ of the pointer-shaft $j$ in the known manner from the segment-shaped member $o$ by means of transmission members, so that a dead center position is avoided.

I claim—

1. Shaft-bearing particularly for weighing scales comprising a frame, a shaft arranged in the same, a rocking arm arranged above said shaft, a rocking arm arranged below the latter, the said rocking arms crossing each other, a concave shaft-bearing face on one rocking arm, and a convex shaft-bearing face on the other rocking arm.

2. In a weighing machine or the like the combination with a spindle of two pivoted arms, curved bearing surfaces on the said arms adapted to cross and to carry the said spindle at their point of decussation, the bearing surface on the one of the said arms being convex and that on the other of the said arms concave, and pivot-points of the said arms being the one above and the other below the said spindle.

In testimony whereof I affix my signature.

KARL VIKTOR HIEBER.